(12) United States Patent
Miller et al.

(10) Patent No.: US 11,031,605 B2
(45) Date of Patent: Jun. 8, 2021

(54) CATHODES FOR USE IN LITHIUM-AIR BATTERIES

(71) Applicant: University of Utah Research Foundation, Salt Lake City, UT (US)

(72) Inventors: Jan Miller, Salt Lake City, UT (US); Xuming Wang, Salt Lake City, UT (US); Jin Lin, Salt Lake City, UT (US); Yue Lin, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 8 days.

(21) Appl. No.: 16/626,189

(22) PCT Filed: Jun. 21, 2018

(86) PCT No.: PCT/US2018/038828
§ 371 (c)(1),
(2) Date: Dec. 23, 2019

(87) PCT Pub. No.: WO2018/237188
PCT Pub. Date: Dec. 27, 2018

(65) Prior Publication Data
US 2020/0119364 A1    Apr. 16, 2020

Related U.S. Application Data

(60) Provisional application No. 62/523,163, filed on Jun. 21, 2017.

(51) Int. Cl.
*H01M 12/08* (2006.01)
*H01M 4/86* (2006.01)
(Continued)

(52) U.S. Cl.
CPC ......... *H01M 4/8647* (2013.01); *H01M 4/382* (2013.01); *H01M 4/8605* (2013.01);
(Continued)

(58) Field of Classification Search
None
See application file for complete search history.

(56) References Cited

U.S. PATENT DOCUMENTS 6,143,216 A    11/2000 Loch et al.
8,334,070 B2    12/2012 Ryu et al.
(Continued)

FOREIGN PATENT DOCUMENTS

CN    105932235        9/2016
JP    2014032776 A  *  2/2014
(Continued)

OTHER PUBLICATIONS

Lin et al.; "Natural Halloysite Nano-Clay Electrolyte for Advanced All-Solid-State Lithium-Sulfur Batteries." Nano Energy; Nov. 25, 2016; vol. 31; pp. 478-485.
(Continued)

*Primary Examiner* — Tracy M Dove
(74) *Attorney, Agent, or Firm* — Thorpe North & Western, LLP.

(57) ABSTRACT

A cathode (100) for use in a lithium-air battery can include a polymer binder (150) having a conductive material (120), phyllosilicate nanoparticles (110), a lithium salt (130), and a metal catalyst (140) distributed in the polymer binder (150). The cathode (100) can be porous to allow oxygen to diffuse from surrounding air into the cathode (100). A lithium-air battery can include a lithium metal anode, a solid electrolyte in contact with the lithium metal anode, and a cathode (100) in contact with the solid electrolyte. The cathode (100) can have a polymer binder (150) as a support matrix. The polymer binder (150) can be porous to allow oxygen to diffuse from surrounding air into the cathode (100). The cathode (100) can include the polymer binder (150), a conductive material (120), phyllosilicate nanoparticles
(Continued)

(110), a lithium salt (130), and a metal catalyst (140) distributed in the polymer binder (150).

20 Claims, 7 Drawing Sheets

(51) Int. Cl.
   *H01M 4/38* (2006.01)
   *H01M 4/02* (2006.01)
(52) U.S. Cl.
   CPC ....... *H01M 4/8668* (2013.01); *H01M 4/8673* (2013.01); *H01M 12/08* (2013.01); *H01M 2004/027* (2013.01); *H01M 2004/8689* (2013.01)

(56) References Cited

U.S. PATENT DOCUMENTS

| | | | |
|---|---|---|---|
| 10,044,060 B1 * | 8/2018 | Young | H01M 10/0569 |
| 2003/0143467 A1 | 7/2003 | Riley et al. | |
| 2005/0274000 A1 | 12/2005 | Oh et al. | |
| 2012/0237838 A1 | 9/2012 | Uesaka | |
| 2013/0011733 A1 | 1/2013 | Chang et al. | |
| 2013/0189592 A1 | 7/2013 | Roumi et al. | |
| 2015/0099185 A1 | 4/2015 | Joo et al. | |
| 2016/0064785 A1 | 3/2016 | Kim et al. | |
| 2016/0079641 A1 | 3/2016 | Kim et al. | |
| 2016/0248100 A1 | 8/2016 | Joo et al. | |
| 2016/0322685 A1 | 11/2016 | Choi | |
| 2016/0344079 A1 | 11/2016 | Kim et al. | |

FOREIGN PATENT DOCUMENTS

| | | | |
|---|---|---|---|
| WO | WO 2008/007814 A1 | 1/2008 | |
| WO | WO 2015/084945 A1 | 6/2015 | |

OTHER PUBLICATIONS

PCT Application No. PCT/US18/38828 Filing date Jun. 21, 2018; Jan Miller, International Search Report dated, Sep. 18, 2018; 21 Pages.

* cited by examiner

CATHODES FOR USE IN LITHIUM-AIR BATTERIES

RELATED APPLICATIONS

This application claims the benefit of U.S. Provisional Application No. 62/523,163, filed Jun. 21, 2017, which is incorporated herein by reference.

GOVERNMENT INTEREST

None.

BACKGROUND

Li-ion battery technology has been applied for both flexible portable electronic devices and more recently for transportation systems, including hybrid and electric vehicles. However, great challenges for high energy density still exist in wider applications of Li-ion batteries. Besides, the solvent leakage and flammability of some conventional liquid electrolytes cause significant safety concerns. Research continues in an attempt to develop batteries with both higher energy density and improved safety.

Lithium-air batteries use oxidation/reduction of lithium at the anode and reduction/oxidation of oxygen at the cathode to release and store energy. This battery technology is of interest to researchers because of its extremely high theoretical specific energy (over 11,000 Wh/kg). However, the inefficient oxygen transport and reaction in the cathode constrain the battery to operate in an oxygen atmosphere, which limits its application to air. Furthermore, protection of the lithium anode has been another obstacle to obtaining a high performance lithium-air battery.

SUMMARY

A cathode for use in a lithium-air battery can include a polymer binder having a conductive material, phyllosilicate nanoparticles, a lithium salt, and a catalyst distributed in the polymer binder. The cathode can be porous to allow oxygen to diffuse from surrounding air into the cathode.

In some examples, the polymer binder can include polyethylene oxide, poly(acrylic acid), polyvinylidene fluoride, polycarbonate, cellulose, sugar, polysiloxane, or a combination thereof.

In further examples, the conductive material can include carbon, polyaniline, polythiophene, polypyrrole, polyacetylene, or a combination thereof.

In a particular example, the phyllosilicate nanoparticles can include halloysite nanotubes. In a further example, the phyllosilicate nanoparticles can be present in an amount from 3 wt % to 5 wt % based on the total weight of the cathode.

In one alternative, the phyllosilicate nanoparticles can be modified. For example, the nanoparticles can be modified to make them conductive, catalytically active, etc.

In other examples, the lithium salt can include lithium bis(trifluoromethanesulfonyl)imide (LiTFSI), $LiFP_6$, $LiClO_4$, LiBOB, LiFSI, $LiBF_4$, or a combination thereof. In some cases, the lithium salt can be present in an amount from 5 wt % to 20 wt % based on the total weight of the cathode.

In still further examples, the catalyst can include $MnO_2$, $SnO_2$, $CoO_2$, ZnO, $TiO_2$, $CeO_2$, $NiO_2$, $InO_x$, $MoO_x$, $WO_x$ and a metal catalyst, or a combination thereof. In certain examples, the metal catalyst can be present in an amount from 20 wt % to 25 wt % based on the total weight of the cathode.

In another embodiment of the present technology, a lithium-air battery can include a lithium metal anode, a solid electrolyte in contact with the lithium metal anode, and a cathode in contact with the solid electrolyte. The cathode can have a polymer binder as a support matrix which is porous to allow oxygen to diffuse from surrounding air into the cathode. The cathode can include the polymer binder, a conductive material, phyllosilicate nanoparticles, a lithium salt, and a metal catalyst distributed in the polymer binder. In a further example, the lithium-air battery can include a battery casing containing the lithium metal anode, solid electrolyte, and cathode. The battery casing can have openings to allow air to contact the cathode from outside of the battery casing.

In some examples, the lithium air battery can have a high energy density (e.g. theoretical energy density of a lithium air battery is 5210 Wh/kg). However, the practical specific energy can be from 900 to 1700 Wh/kg.

In further examples, the solid electrolyte can include a solid polymer, phyllosilicate nanoparticles distributed in the solid polymer, and a lithium salt distributed in the solid polymer. In certain examples, the phyllosilicate nanoparticles distributed in the solid polymer can include a bilayer phyllosilicate. In a particular example, the phyllosilicate nanoparticles distributed in the solid polymer can include halloysite nanotubes.

In still further examples, the solid polymer can include one or more of polyethylene oxide, polymethyl methacrylate, polycarbonate, polysiloxane, starch, sugar, fiber, polyvinyl alcohol, polyphosphazene and polystyrene.

In another embodiment of the present technology, a method of making a cathode for use in a lithium-air battery can include dispersing a polymer binder, a conductive material, phyllosilicate nanoparticles, a lithium salt, and a metal catalyst in a solvent; and removing the solvent to form a solid porous cathode comprising the polymer binder having the conductive material, phyllosilicate nanoparticles, the lithium salt and the metal catalyst distributed therein.

Figure 1:
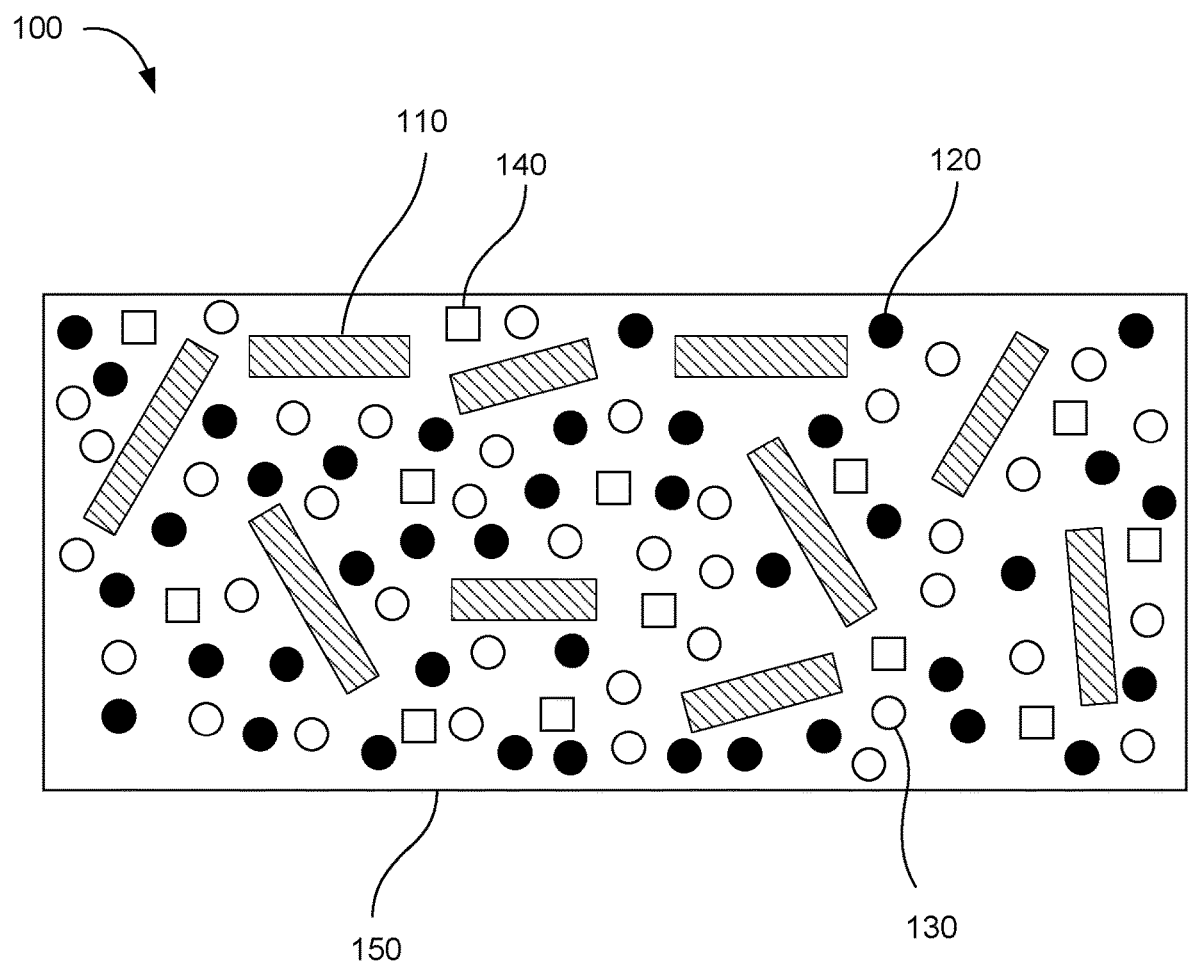
FIG. 1 is a schematic cross sectional view of a cathode in accordance with an example of the present technology.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "bilayer phyllosilicate" refers to a phyllosilicate material having a crystal structure with a positively charged surface on one face and a negatively charged surface on an opposite face. In some cases bilayer phyllosilicates can form flat sheets with oppositely charged top and bottom faces, or nanotubes with oppositely charged interior and exterior surfaces. Phyllosilicates, in general, are silicate minerals containing silicate tetrahedrons arranged in sheets. Non-limiting examples of phyllosilicates include halloysite, kaolinite, chrysotile, antigorite, talc, pyrophyllite, montmorillonite, chlorite, mica, sepiolite, serpentine, and others. In some cases, the phyllosilicates are natural unmodified nanomaterials. Bilayer phyllosilicates include halloysite, kaolinite, chrysotile, and antigorite.

As used herein, "nanoparticle" refers to a particle having a dimension in the nanoscale, such as from about 1 nm to about 1000 nm. Nanoparticles can include a variety of morphologies, such as nanospheres, nanoplatelets, nanotubes, and others.

As used herein, the "lithium ion transference number" or "$t^+$" is defined as follows. An electrolyte is tested in a symmetric cell with a lithium anode and a lithium cathode surrounding the electrolyte. When a constant polarization voltage of 10 mV is applied to the cell, a current is measured from the initial value to a steady-state value after 4 hours. AC impedance plots of the film before and after polarization are obtained. The frequency range is from 300 kHz to 10 Hz and the signal amplitude is 10 mV. The $t^+$ is given by the following expression:

$$t^+ = \frac{I_S(V - I_0 R_0)}{I_0(V - I_S R_S)}$$

where V is the DC voltage applied to the cell; $R_0$ and $R_S$ are the initial and steady-state resistances of the passivating layer, respectively; and $I_0$ and $I_S$ are the initial and steady-state current, respectively.

As used herein, "conductivity" refers to lithium ion conductivity unless otherwise stated. Conductivity is typically given in units of siemens per centimeter (S cm$^{-1}$). The conductivity ($\sigma$) is:

$$\sigma = \frac{l}{SR_b}$$

where l is the thickness of the electrolyte, $R_b$ is the resistance of the electrolyte, and S is the area of the electrodes used to test the resistance of the electrolyte. The ionic conductivity values described herein were obtained by complex plane impedance plots between 25° C. and 100° C. with an impedance analyzer. The composite solid electrolyte film was sandwiched between a stainless steel (SS) disk with diameter, d=1.6 cm, and the positive shell of a 2025 coin cell to form a symmetric stainless steel/electrolyte/stainless steel cell for testing.

As used herein, "porosity" refers to a ratio of the volume of pores or void space in a material to the geometric volume of the material. Porosity can be measured using suitable methods such as, but not limited to, BET method and gas permeability measurements.

It is noted that, as used in this specification and in the appended claims, the singular forms "a," "an," and "the" include plural referents unless the context clearly dictates otherwise. Thus, for example, reference to "a salt" includes one or more of such materials, and reference to "dispersing" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. The use of "substantially" is equally applicable when used in a negative connotation to refer to the complete or near complete lack of an action, characteristic, property, state, structure, item, or result.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, "soluble" refers to substances that can be dissolved in a solvent to form a single-solution. Substances that are "soluble" in a particular solvent are defined as substances that can be dissolved in the solvent in an amount of at least 5 grams per liter of solvent.

As used herein, a plurality of items, structural elements, compositional elements, and/or materials may be presented in a common list for convenience. However, these lists should be construed as though each member of the list is individually identified as a separate and unique member. Thus, no individual member of such lists should be construed as a de facto equivalent of any other member of the same list solely based on their presentation in a common group without indications to the contrary.

Concentrations, amounts, and other numerical data may be presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where, for a specific claim limitation, all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Examples of the Technology

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing a system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the accompanying figures should not be considered limiting.

The present technology provides cathodes for use in lithium-air batteries. Lithium-air batteries are a type of metal-air battery having a potentially higher energy density than other metal-air batteries. The term "metal-air batteries" refers to batteries comprising or consisting of a metal-based anode and an air-based cathode that can use oxygen from the ambient air. Specific types of metal-air batteries are characterized by the metal anode. For example, zinc-air batteries are batteries containing zinc metal as the anode material. Lithium-air (Li-air) batteries can have exceptionally high specific energy and power. This can potentially qualify Li-air batteries as an energy source for electric vehicle propulsion. Li-air batteries can also be useful in many other applications that can benefit from a low weight, high power battery.

Among all types of batteries, lithium batteries in general have attracted attention because the theoretical energy density of lithium metal is the highest of all solid electrodes. However, the energy densities of lithium-ion batteries have been limited by the inherent low energy density of available cathode materials. Many cathode materials used in lithium-ion batteries have been heavy, leading to lower specific energy and specific power for the batteries. However, the present technology can provide a lighter cathode material that uses oxygen from ambient air to react with lithium ions in the cathode. Therefore, the cathodes described herein can be used to make batteries with higher specific energy and specific power.

The theoretical specific energy of Li-air batteries is calculated as 5,200 Wh/kg, or equivalently, 18.7 MJ/kg including oxygen. Since oxygen is constantly drawn from the air, the specific energy is often quoted excluding oxygen content. This theoretical specific energy is calculated to be 11,140 Wh/kg, or 40.1 MJ/kg, which is close to the specific energy for gasoline, which is around 46 MJ/kg. Interest in Li-air batteries continues to grow because of the high energy capacity, which is promising when compared with gasoline. Due to engine inefficiencies, both gasoline and the Li-air battery are predicted to achieve a practical specific energy of 1,700 Wh/kg which is several times higher than most existing battery systems.

To date, the overall performance of available Li-air batteries has been inferior to the best available Li-ion batteries. Many scientific and technical challenges are yet to be overcome to produce efficient Li-air electrodes in order to realize the high energy density of Li-air batteries. The difficulties include much lower practical energy density than the theoretical energy density, much higher polarization resistance during discharge-recharge, lower cycling rate and lower cycling life than the current Li-ion batteries. These problems are related to the inefficiency of $O_2$ transportation through the porous cathode and the deposition of insulating products on active sites intended for oxygen reduction and evolution.

To address these issues, the cathodes described herein can have sufficient porosity and minimal tortuosity to facilitate $O_2$ transport to the active sites, with minimum energy loss. Also, the cathodes can have adequate electrical conductivity to conduct electrons to/from these active sites for oxygen reaction. Studies indicate that the resistance to the transport of $O_2$ and Li ions through the pores decreases with porosity, but resistance to electron transport through the porous electrode increases with porosity. These opposing effects of porosity can be compromised to optimize electrode performance.

The cathodes described herein can include nanostructures that can improve battery performance. In particular, the cathodes can include phyllosilicate nanoparticles. The nanostructures can provide advantages such as a large surface area (surface to volume ratio) which can increase the contact area between the electrode and electrolyte as well as increasing the number of active sites for electrode reactions. This, in turn, can reduce electrode polarization loss and improve power density, energy efficiency, and usable energy density. In addition, design of the nanostructures offers increased flexibility for surface modification to achieve multi-functionality, such as enhanced surface catalytic activity for intended electrode reactions, improved surface transport of electro-active species, and improved mechanical strength and structural integrity. Redox potentials of electrode materials can also be modified by nanostructures, resulting in a change of cell voltage.

In summary, the proper architecture and nanostructure can facilitate high power density for the Li-air battery. It is noted, however, that many nano-materials involve a high fabrication cost due to the complex processing for the synthesis of nanostructures. Nanostructures can also cause low volumetric energy density due to reduced packing density of nanoparticles, and undesired side reactions between the electrode and electrolyte due to large surface areas. The nanoscale dimension can be difficult to control.

The cathodes described herein can include phyllosilicate nanoparticles, which in some examples can be found in naturally-occurring sources. Thus, the phyllosilicate nanoparticles can be obtained at comparatively low cost. In one example, halloysite nanotubes (HNTs) can be used to prepare effective cathodes for lithium-air batteries. Halloysite nanotubes are one type of phyllosilicate nanoparticle formed from aluminosilicate nanosheets that naturally occurs as hollow tubular structures. These high quality halloysite nanotubes can be recovered from mineral deposits, such as the halloysite deposits in Utah in the United States. The unit formula for halloysite is $Al_2Si_2O_5$ $(OH)_4 \cdot nH_2O$ [n=0 for halloysite-(7 Å) and n=2 for hydrated halloysite-(10 Å)]. Unlike other nano-structured clays that must be exfoliated, HNTs naturally occur as cylinders with average diameters typically smaller than 100 nm and lengths ranging from 500 nm to over 1.2 μm. As is the case for all bilayer phyllosilicates, the halloysite structure has two components: a sheet of corner-shared silica tetrahedra joined with a sheet of edge-shared alumina octahedra so that the crystal structure of halloysite is described as a 1:1 dioctahedral layered silicate.

Compared to other nanomaterials which can be toxic and costly, such as carbon nanotubes, graphene, etc., halloysite nanotubes have several advantages. For example, halloysite is a natural nanotube material which is economical, and has excellent chemical and physical stability. In this way the HNT nanocomposite provides good mechanical and thermal properties. HNTs have excellent physical & chemical stability and have a high structural water release temperature (400-600° C.). HNTs can also easily be dispersed in a polymer electrolyte host (HNTs are relatively hydrophobic due to the siloxane group at the outer surface of HNTs and less tube-tube interaction). HNT is a relatively low density (2.14-2.59 specific gravity) material, suitable for lightweight polymer composites. HNT can also be used as a flame-retardant in the polymer matrix as a barrier against heat transfer. The bilayer structure of HNT with one face containing $SiO_2$ and another face containing $Al(OH)_3$ can provide more Lewis acid-base interaction sites for Li salt dissociation.

Compared with other frequently reported lithium-air batteries operating in an oxygen atmosphere, the lithium-air batteries described herein can have the advantage of operation in ambient air. Without being bound to a particular mechanism, the improved performance of batteries with HNTs may be due to the following conditions:

The HNT is a layered aluminosilicate, $Al_2Si_2O_5(OH)_4$, with a naturally occurring tubular structure at a nanoscale. HNTs have typical dimensions of 10-50 nm for the outer diameter and 5-20 nm for the inner diameter, with a length of 50-1000 nm. The nano-scale provides a large surface area which increases the contact area between the electrode and electrolyte, and hence, the number of active sites for electrode reactions. This, in turn, can reduce electrode polarization loss and improves power density, energy efficiency and usable energy density. Further, it can offer increased surface catalytic activity.

The HNT material has two face surfaces; the outer surface contains a —Si—O—Si-silica tetrahedral sheet, while the inner surface consists of —Al—OH groups from the octahedral sheet. In kaolinite (same composition as halloysite, but flat plate nanoparticles rather than tubes), the inner aluminol face surface can be positively charged, whereas the silica face surface can be negatively charged. This distinction in surfaces enables selective immobilization of charged species, such that negatively charged species will have an additional driving force for adsorption inside the tube while positively charged species will be accommodated on the outside of the nanotube. In this way, $Li^+$ transport in the cathode can be facilitated.

The HNT hollow tubular structure can provide sufficient porosity for oxygen transport. The small pore size (5-20 nm for inner diameters of the tube) can reduce the resistance for charge transfer across the interface. In addition, this thin film cathode with a short diffusion length which is associated with HNT reduces the distance that Li ions and electrons travel during cycling in solid state through the electrode material. For a solid-state diffusion of Li ions in an electrode material, the time constant for diffusion τ is determined by the diffusion constant D, and diffusion length L, as described by following equation:

$$\tau = \frac{L^2}{D}$$

The time for Li transport decreases with a decrease in the diffusion path length to the $2^{nd}$ power.

In some examples, Li-air batteries use oxygen from ambient air. However, moisture content in the air can potentially result in water transport into the battery and reaction with the lithium anode, which can shorten the battery lifespan. In certain examples, the cathodes described herein can have a hydrophobic character which may reduce water transport. The all-solid-state polymer thin film electrolyte can also provide good protection for the Li metal anode.

With this description in mind, FIG. 1 is a schematic cross-sectional view of a cathode 100 in accordance with an example of the present technology. As mentioned above, the cathode can include phyllosilicate nanoparticles 110. The phyllosilicate nanoparticles shown in this example are in the form of elongated nanotubes, but other nanoparticle morphologies can also be used. The cathode can also include a conductive material 120, a lithium salt 130, and a metal catalyst 140. The phyllosilicate nanoparticles, conductive material, lithium salt, and metal catalyst can be distributed in a polymer binder 150. Additionally, the cathode can be porous to allow oxygen to diffuse from surrounding air into the cathode.

Figure 2:
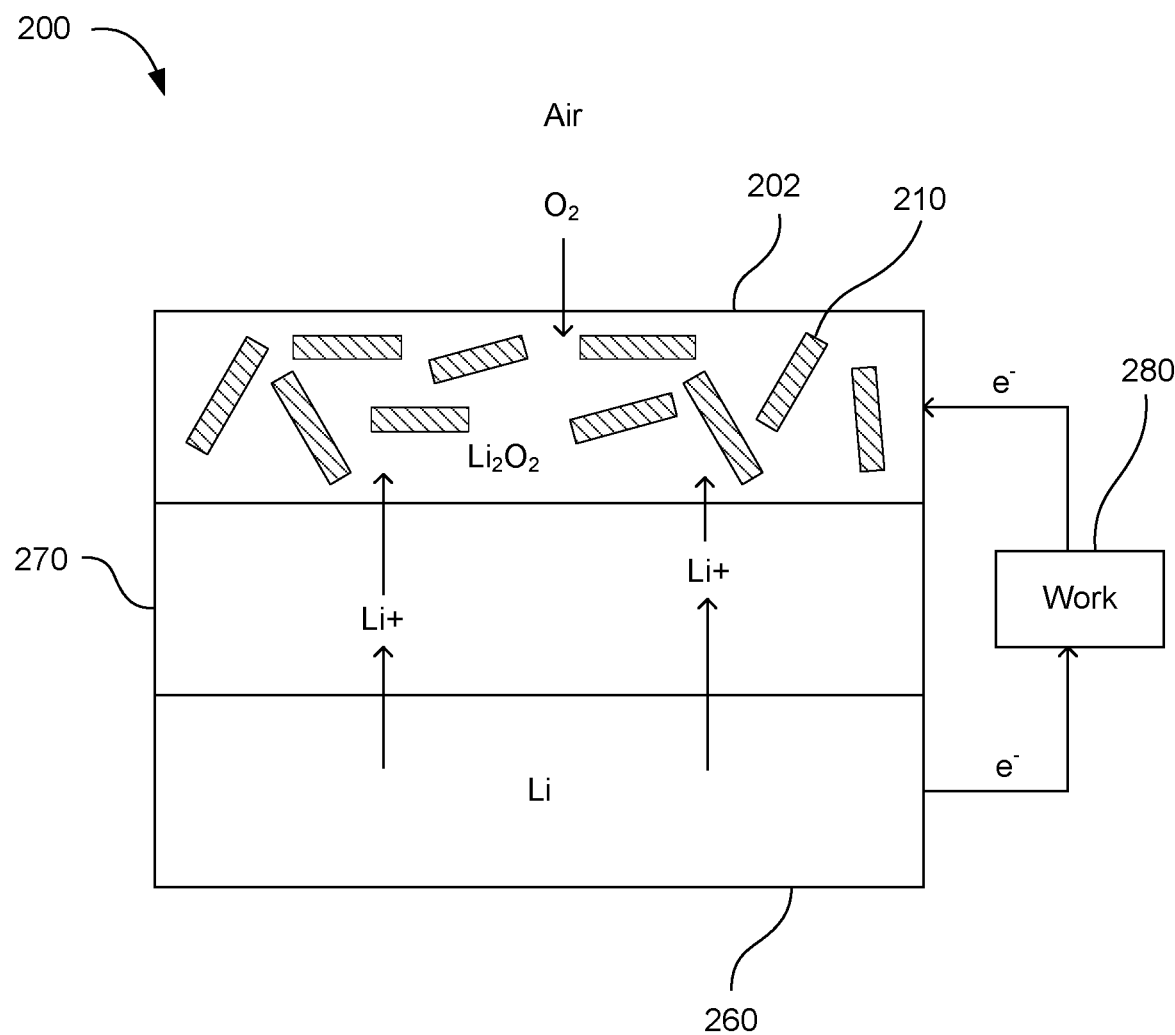
FIG. 2 is a schematic cross sectional view of a lithium air battery in accordance with an example of the present technology.

FIG. 2 shows a schematic cross-sectional view of a Li-air battery cell 200 that includes this type of cathode 202. The cathode includes phyllosilicate nanoparticles 210 distributed in a polymer binder. The cathode can also include a conductive material, a lithium salt, and a metal catalyst distributed in the polymer binder. The conductive material, lithium salt, and metal catalyst are not shown in this figure for the sake of clarity. The battery cell also includes a lithium metal anode 260. The anode is separated from the cathode by a solid electrolyte 270. When the battery cell discharges, positive lithium ions leave the lithium metal anode and diffuse through the solid electrolyte and into the cathode. At the same time, electrons travel from the anode through circuitry 280 to perform work. The electrons then travel to the cathode. Oxygen gas ($O_2$) from the ambient air diffuses into the cathode and reacts with lithium ions and electrons to form $Li_2O_2$ in the cathode. In some examples, the battery can be recharged by reversing this process.

In certain examples, the cathode and the solid electrolyte can both include phyllosilicate nanoparticles. In a particular example, the solid electrolyte can include a solid polymer, phyllosilicate nanoparticles distributed in the solid polymer, and a lithium salt distributed in the solid polymer. The phyllosilicate can increase lithium ion transport through the solid electrolyte. In certain examples, the cathode and the solid electrolyte can both include halloysite nanotubes.

In further examples, the cathodes described herein can be used in lithium-air batteries together with the solid electrolytes described in PCT International Application No. PCT/US17/22774, filed Mar. 16, 2017, which claims priority to U.S. Provisional Application No. 62/390,051, filed Mar. 16, 2016, which are each incorporated by reference.

In some examples, the cathode can include phyllosilicate nanoparticles distributed in a polymer binder. Although HNT has been described as a particular example of a phyllosilicate material for use in the Li-air battery cathodes, other phyllosilicate materials can be used as well. In some examples, the phyllosilicate used in the cathode can be nanoparticles of kaolinite, halloysite, chrysotile, antigorite, talc, pyrophyllite, montmorillonite, chlorite, mica, sepiolite, serpentine, or a combination thereof. In various examples, the phyllosilicates can be bilayer, trilayer or mixed layer structures and include both tubular structures and flat, layered structures. In certain examples, the phyllosilicates can be either aluminum or magnesium phyllosilicates which can be modified to promote the transport of lithium ions. In one such example, the modification can include, but is not limited to, replacement of interlayer cations with lithium ions. In certain examples, the phyllosilicate can be in the form of nanotubes. In further examples, phyllosilicate nanoparticles can be present in the cathode in an amount from 1 wt % to 25 wt %, and in some cases 3 wt % to 5 wt %.

In further examples, the phyllo silicate nanoparticles can be in the form of nanotubes, nanoplatelets, or a combination thereof. In one specific aspect, the phyllosilicate nanoparticles can be bilayer phyllosilicate nanoparticles. In certain examples, the phyllosilicate nanoparticles can include bilayer phyllosilicates (1:1 type) such as kaolinite, halloysite, chrysotile, antigorite; trilayer phyllosilicates (2:1 type) such as talc, pyrophyllite, illite, mica, montmorillonite; and more complex phyllosilicates (e.g. 2:1:1 types) such as chlorite (e.g. clinochlore), phlogopite, saponite, palygorskite, sepiolite, serpentine, or a combination thereof. Bilayer phyllosilicate nanoparticles include halloysite, kaolinite, chrysotile, and antigorite, or a combination thereof. In one example, the bilayer phyllosilicate nanoparticles can be halloysite nanotubes.

As mentioned above, in some examples the cathode can be used together with a solid electrolyte that also includes phyllosilicate nanoparticles. In various examples, the phyllosilicate nanoparticles in the solid electrolyte can be the same phyllosilicate material as used in the cathode, or a different phyllosilicate material.

In further examples, the phyllosilicate nanoparticles can be chemically modified. In a particular example, the phyllosilicate nanoparticles can be in the form of nanotubes having a polymer electrolyte impregnated in an interior volume of the nanotubes. In some cases, the polymer electrolyte can be a liquid. In a certain example, the phyllosilicate nanoparticles in the solid electrolyte can be nanotubes impregnated with a polymer electrolyte while the phyllosilicate nanoparticles in the cathode can be nanotubes that are open in the interior to allow for diffusion of oxygen gas.

In other examples, the ionic conductivity of the cathode and/or the solid electrolyte can be affected by using phyllosilicate nanotubes grafted with short chain functional groups. The functional groups can bind with the inside atoms of the nanotube and occupy the volume within the nanotubes, providing a high ionic conductivity pathway for ions within the nanotubes. The short chain functional group can be carbonate, ethylene oxide, or phosphazene, although other groups can be suitable.

The polymer binder can bind the phyllosilicate nanoparticles and other ingredients in the cathode. In certain examples, the polymer binder can include polyethylene oxide (PEO), poly(acrylic acid), polymethyl methacrylate, polyvinylidene fluoride, polyvinyl alcohol, polyphosphazene, polystyrene, polycarbonate, cellulose, starch, sugar, polysiloxane, or a combination thereof. In certain examples, the polymer binder can be present in the cathode in an amount from 1 wt % to 40 wt %. In further examples, the polymer binder can be present in an amount from 1 wt % to 30 wt %. In still further examples, the cathode can be used with a solid electrolyte that includes the same polymer binder as the cathode or a different solid polymer.

The cathode can also include a conductive material distributed in the polymer binder. The conductive material can improve the ability of the cathode to conduct electrons to and from reaction sites in the cathode. In some examples the conductive material can be a particulate material such as carbon powder. In further examples, the conductive material can include carbon, polyaniline, polythiophene, polypyrrole, polyacetylene, or a combination thereof. In various examples, the conductive material can be present in the cathode in an amount from 1 wt % to 50 wt %. In certain examples, the conductive material can be present in an amount from 20 wt % to 40 wt %. For example, the conductive material can be present in an amount sufficient to make the cathode conductive. In some examples, the conductive material can be dispersed or dissolved in a solvent with the other cathode ingredients and then the dispersion can be cast and dried to form the cathode. The resulting cathode can have the conductive material well-dispersed in the polymer bind so that the cathode is electrically conductive. In certain examples, the conductive material can be a conductive polymer that can be soluble in the solvent. In some cases the solvent can include water and the conductive material can be a conductive polymer that is water soluble. In other examples, the solvent can be an organic solvent and the conductive polymer can be soluble in the organic solvent. In still further examples, the conductive material can be a conductive polymer dispersion such as a conductive latex polymer.

The cathode can also include a lithium salt distributed in the polymer binder. In some examples, the lithium salt can include lithium bis(trifluoromethanesulfonyl)imide (LiTFSI), LiFP$_6$, LiClO$_4$, LiBOB, LiFSI, LiBF$_4$, or a combination thereof. In certain examples, the lithium salt can be present in an amount from 5 wt % to 30 wt %. In further examples, the lithium salt can be present in an amount from 10 wt % to 20 wt %. In a certain example, the lithium salt can be LiTFSI and the weight ratio of LiTFSI to phyllosilicate nanoparticles in the cathode can be from 1:2 to 6:1. To distribute the lithium salt in the polymer binder, in some examples the polymer binder and lithium salt can be dissolved in a solvent and then the solution can be cast and dried to form the cathode.

In further examples, the cathode can be used together with a solid electrolyte and the solid electrolyte can also include a lithium salt. In certain examples, the solid electrolyte and the cathode can both include the same lithium salt. In another example, the solid electrolyte can include polyethylene oxide and a molar ratio of ethylene oxide units in the polyethylene oxide to lithium ions in the solid electrolyte can be from 8:1 to 25:1.

In a further example, the cathode can have a lithium ion conductivity of at least $10^{-4}$ S cm$^{-1}$ at 25° C. In further examples, the cathode can have a lithium ion conductivity from $10^{-4}$ S cm$^{-1}$ at 25° C. to $10^{-1}$ S cm$^{-1}$ at 25° C. Lithium ion conductivity can be measured by electrochemical impedance spectroscopy (EIS).

In further examples, the cathode can include a metal catalyst. The catalyst can facilitate the reaction of lithium and oxygen in the cathode. In some examples, the catalyst can include MnO$_2$, SnO$_2$, CoO$_2$, ZnO, TiO$_2$, CeO$_2$, NiO$_2$, InO$_x$, MoO$_x$, WO$_x$ and a metal catalyst, or a combination thereof. In further examples, the metal catalyst can be present in the cathode in an amount from 15 wt % to 30 wt %. In certain examples, the metal catalyst can be present in an amount from 20 wt % to 25 wt %.

The cathode can be porous to allow oxygen to diffuse from ambient air into the cathode. In some examples, the cathode can have a porosity of 10% to 80% throughout the cathode. In further examples, the cathode can have a porosity of 40% to 60%. In some examples, the polymer binder can be porous in that the polymer binder can include void spaces open to allow oxygen to diffuse from surrounding air into the cathode. In further examples, the phyllosilicate nanoparticles and/or metal catalyst particles can be porous. In certain examples, the phyllosilicate nanoparticles or metal catalyst particles or conductive material can be porous, and the polymer binder can also be porous.

The porosity can be formed in any suitable manner. Non-limiting examples of porosity forming techniques can include adding porous nanoparticle fillers, dissolving low molecular weight portions, rapid evaporation of solvent during preparation, and the like.

The dimensions of the cathode can be any suitable size to be used in a battery. In some examples, the cathode can be formed as a large thin film having a large surface area. In certain examples, this can be useful for constructing batteries that are very thin but still have a large capacity. In further examples, the cathode film can be flexible so that the cathode can be curved, bent, folded, and so on. In certain examples, a battery can be constructed with a cathode that is folded multiple times to provide a large cathode surface area in a compact volume. Forming the cathode as a thin film can also provide a small diffusion distance for lithium ions and oxygen molecules to improve the performance of the battery. In some examples, the cathode can be a film having a thickness from 1 μm to 300 μm. In further examples, the cathode can have a thickness from 10 μm to 100 μm.

The present technology also extends to lithium-air batteries including the cathodes, and methods of making the cathodes. A battery can include a lithium anode, a cathode, and a solid electrolyte. The cathode can include a Li-ion conducting polymer binder, phyllosilicate nanoparticles, a conductive material, a lithium salt, and a metal catalyst. The polymer binder can be porous to allow oxygen to diffuse from surrounding air into the cathode. The conductive material, phyllosilicate nanoparticles, lithium salt, and metal catalyst can be distributed in the polymer binder. In one example, the conductive material can be carbon. These components can be directly mixed or made into a composite by in-situ synthesis methods.

Figure 3A:
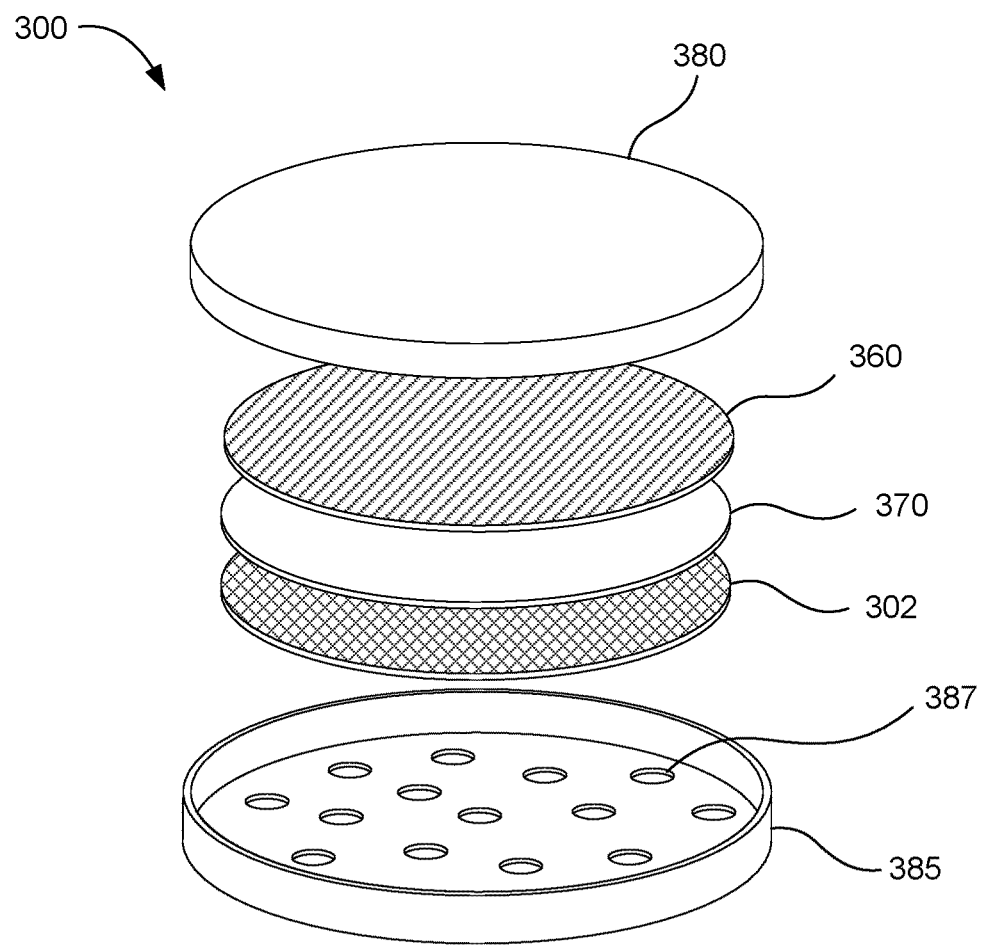
FIG. 3A is an exploded view of a lithium air battery in accordance with an example of the present technology.

FIG. 3A shows an exploded view of a battery 300 in accordance with an example of the present technology. The battery includes a cathode 302, a lithium anode 360, and a solid electrolyte 370 sandwiched between an anode shell 380 and a cathode shell 385. The cathode shell includes openings 387 to allow oxygen to diffuse from surrounding air into the cathode. Although not shown in the figure, the cathode can include phyllosilicate nanoparticles, a conductive material, a lithium salt, and a metal catalyst distributed in a polymer binder. The solid electrolyte can also include phyllosilicate nanoparticles and a lithium salt distributed in a lithium ion-conducting polymer.

Figure 3B:
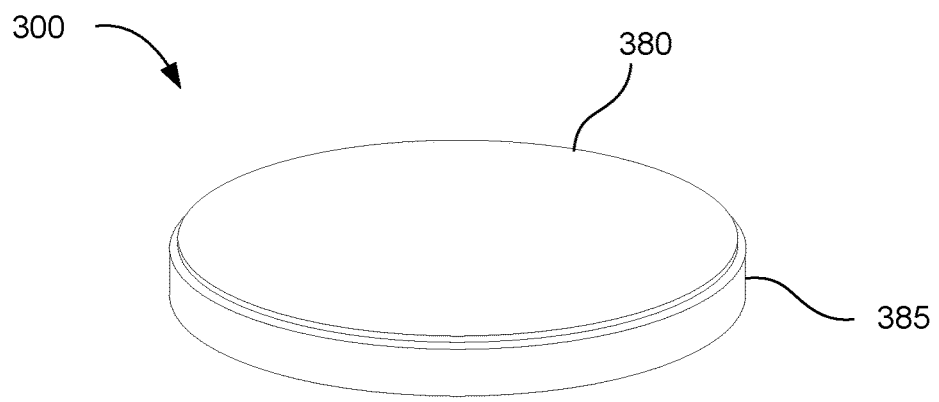
FIG. 3B is an assembled view of a lithium air battery in accordance with an example of the present technology.

FIG. 3B shows an assembled view of the battery 300. The anode shell 380 is exposed on the top of the battery and the cathode shell 385 is exposed on the bottom of the battery, allowing the battery to be electrically connected to a circuit to provide electric power. The openings in the cathode shell can allow oxygen from the surrounding air to diffuse directly into the cathode as the battery discharges. If the battery is recharged, oxygen can evolve from the cathode as Li$_2$O$_2$ in the cathode splits into lithium ions and O$_2$ molecules. The evolved oxygen can freely exit the cathode through the openings in the cathode shell.

In further examples, the solid electrolyte can be a phyllosilicate-based nanocomposite organic/inorganic material with high Li-ion conductivity at room temperature and below. The solid electrolyte can have any of the ingredients and properties disclosed above.

The all-solid-state battery can provide good cycling performance in air over a wide temperature range. In some examples the battery can be used at temperatures from −10° C. to about 100° C., and in some cases from about 10° C. to about 40° C. The phyllosilicate nanoparticles can enhance oxygen transport and enable cycling in the ambient atmosphere. In addition, the solid electrolyte can protect the lithium anode and facilitate good cycling and battery stability.

In one example, such an all-solid-state battery can run for 150 cycles in air which reduces capacity to 500 mAh/g (carbon). In certain examples, the battery can exhibit decrease in capacity of one half with respect to the initial capacity after 120 cycles, in some cases after about 250 cycles, and in other cases after about 500 cycles. Besides the advantages above, the all-solid-state lithium air battery can have improved safety performance. Flexibility of the cathode, electrolyte and lithium anode can allow for the battery to be fabricated in different geometries. Compared to other nanomaterials, such as carbon nanotubes, graphene etc., the phyllosilicate nanoparticles can have several advantages, for example lower cost and excellent chemical/physical stability. In this way, an easy fabrication of the lithium-air battery can be accomplished at low cost. The all-solid-state lithium-air battery can be used for energy storage, electric vehicles, and portable electronic devices, among other applications. The Li-air batteries can have high energy density, such as energy density from 200 to 1700 Wh/kg.

In some cases, the battery can also have a battery casing to contain the anode, solid electrolyte, and cathode. The battery casing can have openings to allow air to contact the cathode from outside the battery casing. In certain examples, the casing can prevent air and moisture from contacting the lithium anode. Although air and moisture can enter through openings on the cathode side of the battery, in some examples the solid electrolyte can protect the lithium anode from exposure to air and moisture. The battery casing can be made from a variety of materials, such as metal, rigid plastic, a flexible polymer film, and so on. The battery casing an also include conductive contacts electrically connected to the anode and cathode.

The present technology also extends to methods of making a cathode for use in a Li-air battery. In one method, a polymer binder, conductive material, phyllosilicate nanoparticles, lithium salt, and metal catalyst can be dispersed in a solvent. The solvent can then be removed to form a solid porous cathode. The cathode can include the polymer binder having the conductive material, phyllosilicate nanoparticles, lithium salt, and metal catalyst distributed therein.

In some examples, the cathode can have sufficient porosity to allow oxygen from surrounding air to diffuse into the cathode. In certain examples, the cathode can have a porosity of 10% to 80%. In some examples, the void space in the cathode can be distributed throughout the polymer binder. In further examples, the phyllosilicate nanoparticles, conductive material, and/or metal catalyst can be porous and further contribute to the porosity of the cathode.

As mentioned above, in some examples the cathode can be formed by solution casting. The cathode ingredients, including a polymer binder, conductive material, phyllosilicate nanoparticles, lithium salt, and metal catalyst can be dissolved or dispersed in a solvent. The solution or dispersion can then be cast as a then layer of any desired shape. The solvent can be allowed to evaporate to leave a thin film cathode made up of the conductive material, phyllosilicate nanoparticles, lithium salt, and metal catalyst distributed throughout the polymer binder. In certain examples, the evaporating solvent can leave behind voids in the polymer binder, make the cathode porous. In further examples, the phyllosilicate nanoparticles and/or conductive material can be porous and further contribute to the porosity of the cathode.

EXAMPLES

A series of thin film cathodes were formed having the compositions shown in Table 1 below. Polyethylene oxide (PEO, MW=4×10$^6$, Xiamen TOB New Energy Technology Company), lithium bis(trifluoromethanesulfonyl)imide (LiTF SI, 99.5%, Acros), halloysite nanotubes (HNT, 99.5%, Sigma-Aldrich), carbon (Super PLi Conductive Carbon Black from TIMICAL Comp.), $MnO_2$ (as catalyst), and $CH_3CN$ (used as a solvent), in the amounts shown in Table 1, were mixed and ball milled for 20 minutes to prepare a uniform suspension. The suspension was deposited on a plastic surface and the solvent was evaporated to form the thin film cathodes.

The solid polymer electrolyte (SPE) used for this all-solid-state Li-air battery was prepared according to the following procedure: Polyethylene oxide (PEO, MW=4×10$^6$, Xiamen TOB New Energy Technology Company), lithium bis(trifluoromethanesulfonyl)imide (LiTF SI, 99.5%, Acros) and halloysite nanotubes (HNT, 99.5%, Sigma-Aldrich) were dried before use. HNT was dispersed in $CH_3CN$ and stirred for 45 minutes. PEO and LiTFSI were then added and stirred for several hours to form a homogenized solution. The solution was cast and dried into a thin film in an argon filled glove box at 60° C., and a PEO+LiTFSI+HNT electrolyte thin film was made. The amounts of the ingredients in the solid polymer electrolyte were: 0.3 g PEO, 0.13 g LiTFSI, and 0.03 g HNT.

The solid polymer electrolyte was directly placed on top of the cathode film and the two films were pressed together. Then the stacked films were peeled from the plastic substrate surface and placed into a cathode shell which has 9-15 holes. Finally, a Li metal plate as the anode was placed on the electrolyte surface.

The batteries were tested in an air environment at 60° C. The testing current was set to 0.02 mA, and the cutoff conditions were set to either a discharge capacity of 500 mAh/g$_{(carbon)}$ or a discharge voltage of 1.6 V. Cutoff capacity of 500 mAh/g means that during the charge/discharge cycling testing: if the capacity is less than 500 mAh/g the testing will be terminated or when discharge voltage is less than 1.6 V the cycling testing will be also terminated. The following various compositions of the cathodes were evaluated.

TABLE 1

Cathode compositions.

| No. | PEO, g | Carbon, g | $MnO_2$, | Nanotube, g | $CH_3CN$, g | LiTFSI, g |
|---|---|---|---|---|---|---|
| 1 | 0.01 | 0.035 | 0.03 | 0.025 | 2.5 | 0.0176 |
| 2 | 0.02 | 0.035 | 0.03 | 0.015 | 2.5 | 0.0176 |
| 3 | 0.03 | 0.035 | 0.03 | 0.005 | 2.5 | 0.0176 |
| 4 | 0.03 | 0.035 | 0.03 | 0 | 2.5 | 0.0176 |
| 5 | 0.032 | 0.035 | 0.03 | 0.003 | 2.5 | 0.0176 |
| 6 | 0.028 | 0.035 | 0.03 | 0.007 | 2.5 | 0.0176 |
| 7 | 0.03 | 0.035 | 0.03 | 0.005 | 2.5 | 0.0053 |
| 8 | 0.03 | 0.035 | 0.03 | 0.005 | 2.5 | 0.033 |
| 9 | 0.03 | 0.035 | 0.03 | 0.005 | 2.5 | 0 |
| 10 | 0.03 | 0.035 | 0.02 | 0.005 | 2.5 | 0.0176 |
| 11 | 0.03 | 0.035 | 0.04 | 0.005 | 2.5 | 0.0176 |

Figure 4:
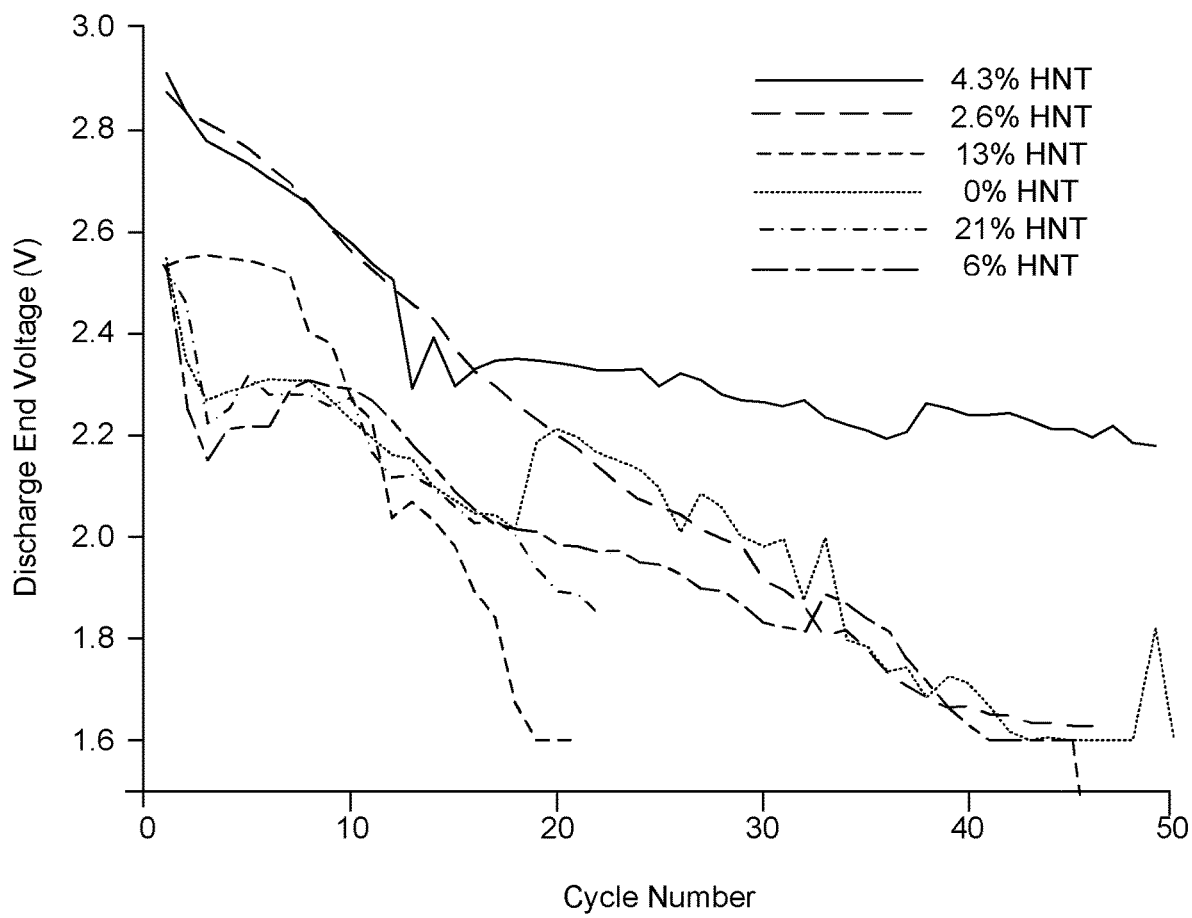
FIG. 4 is a graph of results of cycling performance testing of lithium-air batteries made with various halloysite nanotube (HNT) concentrations in the cathode in accordance with examples of the present technology.

The results from battery cycling performance testing with different HNT concentrations are presented in FIG. 4. Cycling testing is done using battery test equipment (CT2001 Battery Testing Systems from Land Instruments) as previously described (e.g. charge current 0.02 mA, cutoff capacity 500 mAh/g or cutoff voltage 1.6 V.) The battery cycling performance without HNT addition shows a linear decrease in discharge voltage. It is interesting that 4.3% HNT addition gives the best cycling performance. After 15 cycles the discharge voltage remains almost constant. The batteries with higher HNT addition did not show significantly improved cycling performance which may be due to the lower electron conductivity at higher additions of HNT.

Higher discharge voltage of a battery means higher output energy when the current is constant. So, it was selected as a property to optimize the cathode composition. It was found that the discharge end voltage of the battery was related to the HNT concentration. For the battery without HNT, the initial discharge end voltage was 2.53V. The value dropped to the cut off voltage of 1.6 V after 40 cycles. When 2.6% and 4.3% HNT were added to the cathode, the initial discharge end voltage of the battery increased to 2.87 V and 2.91 V. With further increase in HNT concentration to 6, 13 and 21%, the voltage declined. Furthermore, the battery with 4.3% HNT had the discharge end voltage of 2.18 V after 50 cycles, while the battery with 2.6% HNT had dropped to 1.6 V. Therefore, 4.3% was found to be a particularly useful HNT concentration.

Figure 5:
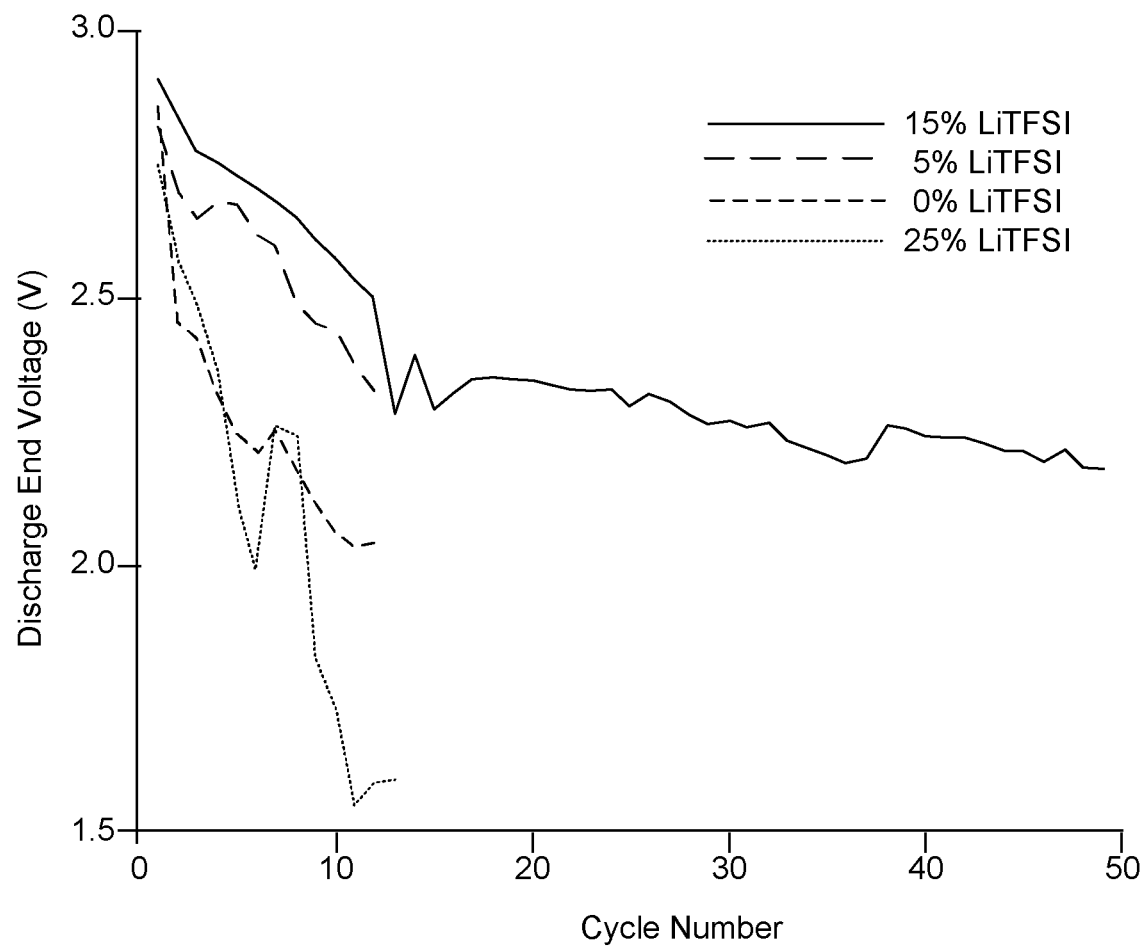
FIG. 5 is a graph of results of cycling performance testing of lithium-air batteries made with various concentrations of lithium bis(trifluoromethanesulfonyl)imide (LiTFSI) in the cathode in accordance with examples of the present technology.

The results from battery cycling performance testing with different lithium bis(trifluoromethanesulfonyl)imide (LiTFSI) concentrations in the cathode are presented in FIG. 5. The batteries with LiTFSI concentrations of 0, 5, 15 and 25% in the cathode have the initial discharge end voltage of 2.86, 2.82, 2.91 and 2.75 V respectively. The four batteries show similar initial voltage but the discharge end voltage of the battery without LiTFSI and the battery with the highest LiTFSI concentration dropped more quickly than those with intermediate LiTFSI concentrations. The battery with 15% LiTFSI provided a higher voltage than the one with 5% LiTFSI. It is reasonable to conclude that the addition of 15% LiTFSI is an appropriate level for improved battery performance.

Figure 6:
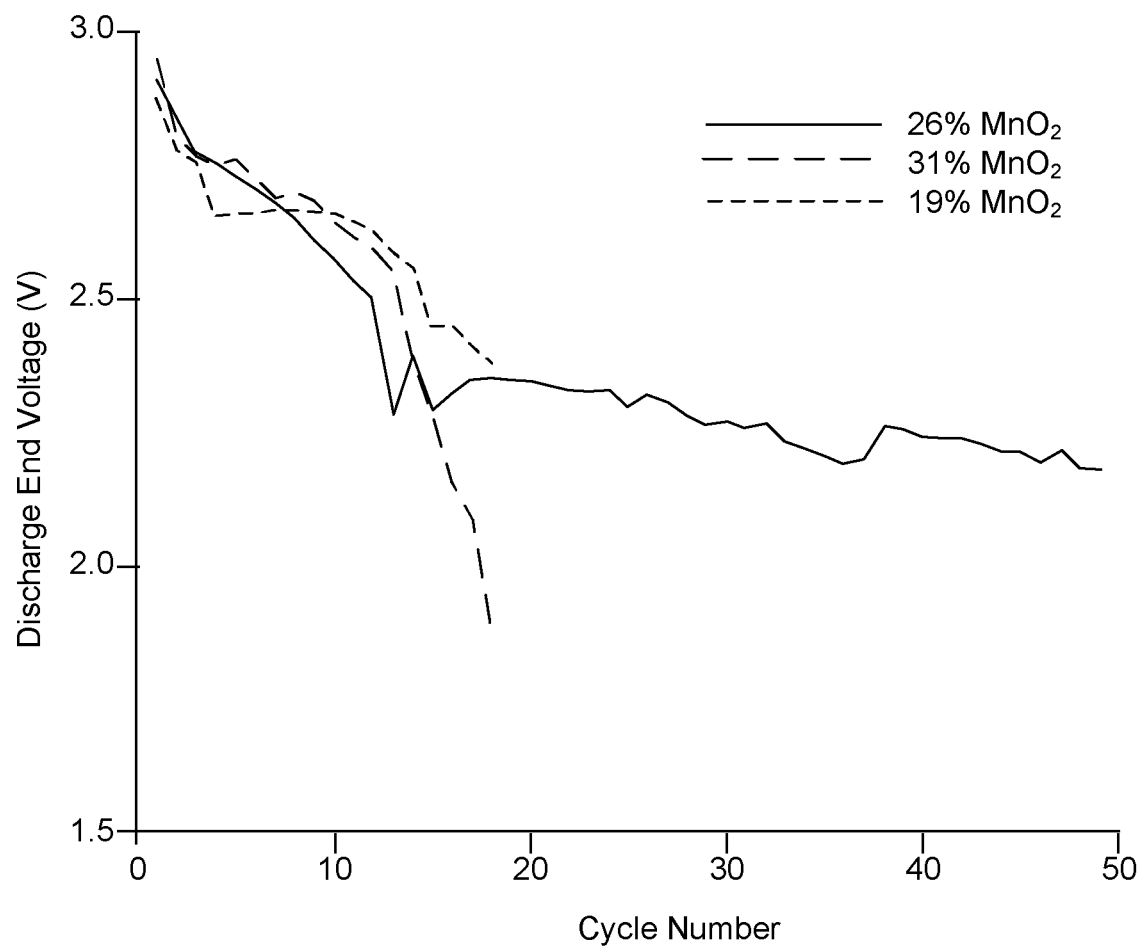
FIG. 6 is a graph of results of cycling performance testing of lithium-air batteries made with various concentrations of $MnO_2$ in the cathode in accordance with examples of the present technology.

$MnO_2$ is a catalyst for $O_2$ reduction (during discharge) and evolution (during recharge), which is which can reduce polarization losses. Therefore addition of $MnO_2$ in the cathode material was also evaluated and the results are shown in FIG. 6. The results indicate that the addition of 26% $MnO_2$ gives better cycling performance and discharge end voltage.

Figure 7:
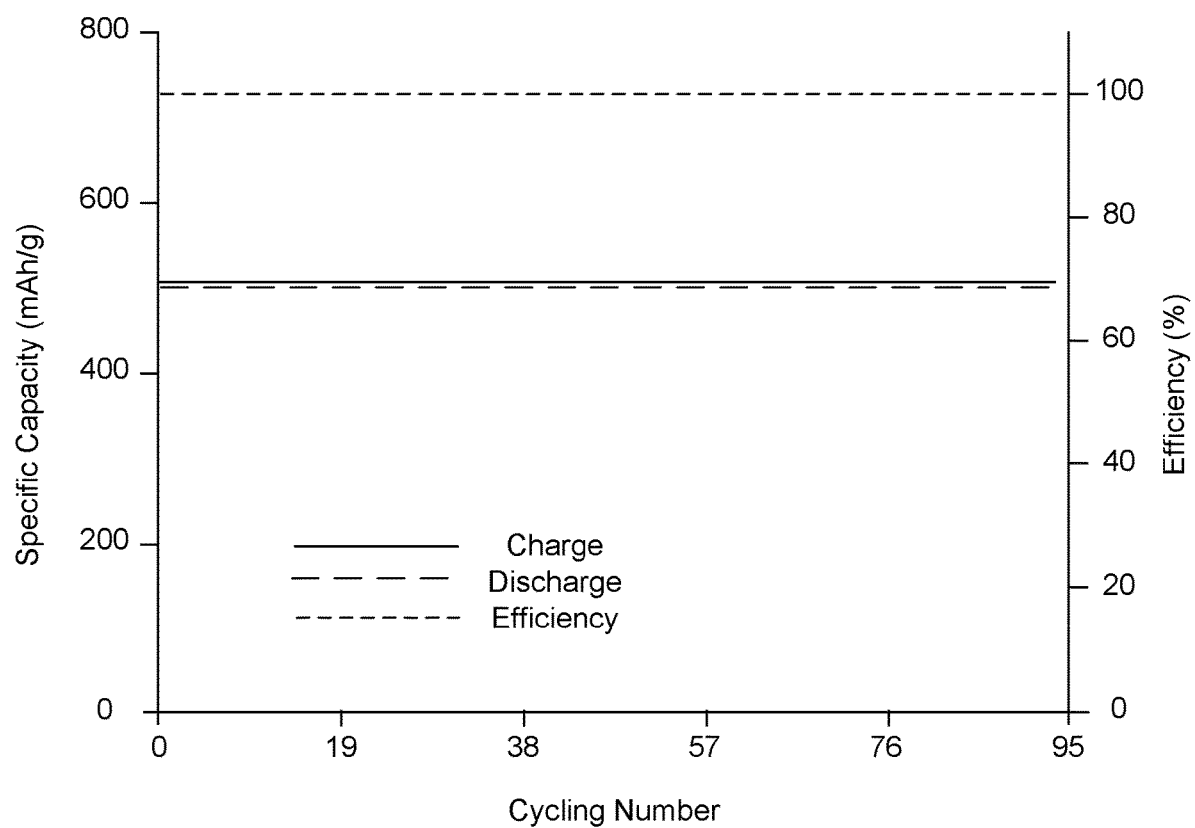
FIG. 7 is a graph of results of cycling performance testing of a lithium-air battery in accordance with an example of the present technology.

The cathode composition containing 4.3% HNT, 15% LiTFSI and 26% $MnO_2$ was made and the cycling performance of the battery using this cathode was evaluated. The results are presented in FIG. 7. The improved capacity and cycle number is demonstrated by the stable 90 cycle performance in ambient air.

In summary, a unique HNT nanocomposite cathode for all-solid-state Li-air batteries has been tested, showing that a small amount of HNT addition to the cathode significantly improves the Li-air battery performance. The improved performance has been demonstrated by 90 stable cycling tests with 100% capacity retention after 90 cycles at a 500 mAh/g specific capacity cut point. Particularly good performance was achieved by an example cathode composition of 4.3 wt % HNT, 15 wt % LiTFSI, and 26 wt % $MnO_2$.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A cathode for use in a lithium-air battery, comprising:
a polymer binder having a conductive material, phyllosilicate nanoparticles, a lithium salt, and a metal catalyst distributed in the polymer binder;
wherein the cathode is porous to allow oxygen to diffuse from surrounding air into the cathode.

2. The cathode of claim 1, wherein the cathode has a porosity of 10% to 80% throughout the cathode.

3. The cathode of claim 1, wherein the polymer binder comprises polyethylene oxide, poly(acrylic acid), polyvinylidene fluoride, polycarbonate, cellulose, sugar, polysiloxane, or a combination thereof.

4. The cathode of claim 1, wherein the conductive material comprises carbon, polyaniline, polythiophene, polypyrrole, polyacetylene, or a combination thereof.

5. The cathode of claim 1, wherein the phyllosilicate nanoparticles comprise a bilayer phyllosilicate.

6. The cathode of claim 1, wherein the phyllosilicate nanoparticles comprise kaolinite, halloysite, chrysotile, antigorite, talc, pyrophyllite, montmorillonite, chlorite, mica, sepiolite, serpentine, or a combination thereof.

7. The cathode of claim 1, wherein the phyllosilicate nanoparticles comprise halloysite nanotubes.

8. The cathode of claim 1, wherein the phyllosilicate nanoparticles are present in an amount from 3 wt % to 5 wt % based on a total weight of the cathode.

9. The cathode of claim 1, wherein the lithium salt comprises lithium bis(trifluoromethanesulfonyl)imide (LiTFSI), $LiFP_6$, $LiClO_4$, LiBOB, LiFSI, $LiBF_4$, or a combination thereof.

10. The cathode of claim 1, wherein the lithium salt is present in an amount from 5 wt % to 20 wt % based on a total weight of the cathode.

11. The cathode of claim 1, wherein the metal catalyst comprises $MnO_2$, $SnO_2$, $CoO_2$, $ZnO$, $TiO_2$, $CeO_2$, $NiO_2$, $InO_x$, $MoO_x$, $WO_x$ and metal catalyst, or a combination thereof.

12. The cathode of claim 1, wherein the metal catalyst is present in an amount from 20 wt % to 25 wt % based on a total weight of the cathode.

13. A lithium-air battery, comprising:
a lithium metal anode;
a solid electrolyte in contact with the lithium metal anode;
a cathode in contact with the solid electrolyte, the cathode having a polymer binder as a support matrix which is porous to allow oxygen to diffuse from surrounding air into the cathode and including: the polymer binder, a conductive material, phyllo silicate nanoparticles, a lithium salt, and a metal catalyst distributed in the polymer binder.

14. The lithium-air battery of claim 13, further comprising a battery casing containing the lithium metal anode, solid electrolyte, and cathode, and having openings to allow air to contact the cathode from outside of the battery casing.

15. The lithium-air battery of claim 13, wherein the lithium air battery has an energy density from 200 to 1700 Wh/kg.

16. The lithium-air battery of claim 13, wherein the solid electrolyte comprises:
a solid polymer;
phyllosilicate nanoparticles distributed in the solid polymer; and
a lithium salt distributed in the solid polymer.

17. The lithium-air battery of claim 16, wherein the phyllosilicate nanoparticles distributed in the solid polymer comprise a bilayer phyllosilicate.

18. The lithium-air battery of claim 16, wherein the phyllosilicate nanoparticles distributed in the solid polymer comprise halloysite nanotubes.

19. The lithium-air battery of claim 16, wherein the solid polymer comprises one or more of polyethylene oxide, polymethyl methacrylate, polycarbonate, polysiloxane, starch, sugar, fiber, polyvinyl alcohol, polyphosphazene and polystyrene.

20. A method of making a cathode for use in a lithium-air battery, comprising:
- dispersing a polymer binder, a conductive material, phyllosilicate nanoparticles, a lithium salt, and a metal catalyst in a solvent;
- removing the solvent to form a solid porous cathode comprising the polymer binder having the conductive material, phyllosilicate nanoparticles, the lithium salt and the metal catalyst distributed therein.

\* \* \* \* \*